Dec. 2, 1941.    P. S. DICKEY    2,264,511
MEASURING AND CONTROLLING SYSTEM
Original Filed June 19, 1935    3 Sheets—Sheet 1

INVENTOR
PAUL S. DICKEY
BY Raymond W. Jenkins
ATTORNEY

INVENTOR
PAUL S. DICKEY
BY
Raymond D. Junkins
ATTORNEY

Dec. 2, 1941.  P. S. DICKEY  2,264,511
MEASURING AND CONTROLLING SYSTEM
Original Filed June 19, 1935   3 Sheets-Sheet 3

INVENTOR
PAUL S. DICKEY
BY
Raymond D. Junkins
ATTORNEY

Patented Dec. 2, 1941

2,264,511

UNITED STATES PATENT OFFICE 2,264,511

MEASURING AND CONTROLLING SYSTEM

Paul S. Dickey, Shaker Heights, Ohio, assignor to Bailey Meter Company, a Delaware corporation Original application June 19, 1935, Serial No. 27,426. Divided and this application November 15, 1938, Serial No. 240,467

7 Claims. (Cl. 236—14)

This invention relates to a method of and apparatus for measuring and/or controlling the output of power utilizing or transforming devices, such as motors, variable speed couplings, engines, etc.

One object of my invention is to provide a control system wherein the rate of output of such devices may be controlled in accordance with the magnitude of a plurality of conditions.

A further object is to provide a control system wherein the actual rate of output of the controlled device is determined and compared against the desired rate, and the actual rate varied until it is equal to, or in proportion to, the desired rate.

Still another object is to provide a control system wherein the actual rate of output of the controlled device is determined and the output of the controlled device varied in accordance with the difference between the actual and the desired rates.

A further object is to provide speed control of a device wherein a first fluid pressure is produced proportional to the desired speed, a second fluid pressure is produced proportional to the actual speed, and compared against the first fluid pressure, and the speed of the device varied until the actual speed is equal to that desired.

Still another object is to provide a speed control of the device wherein a first fluid pressure is produced proportional to the desired speed, a second fluid pressure is produced proportional to the actual speed; and the speed of the device is controlled in accordance with the difference between the first and second fluid pressures.

A further object is to provide a tachometer wherein a fluid pressure is produced proportional to the output speed of the controlled device and the fluid pressure thus produced utilized as an indication of the speed.

A further object of my invention is to provide a tachometer having ample power for operating relatively rugged measuring and/or control devices.

Further objects will be apparent from the following description and from the drawings in which.

Figure 5:
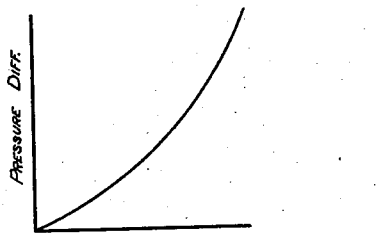
Figure 6:
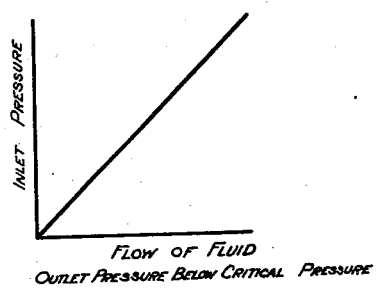
Figure 7:
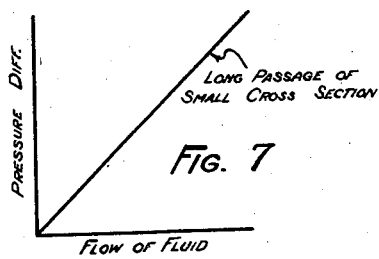

Figs. 5, 6, and 7 are diagrams explaining the performance of different types of restricted aperture arrangements.

Figure 8:
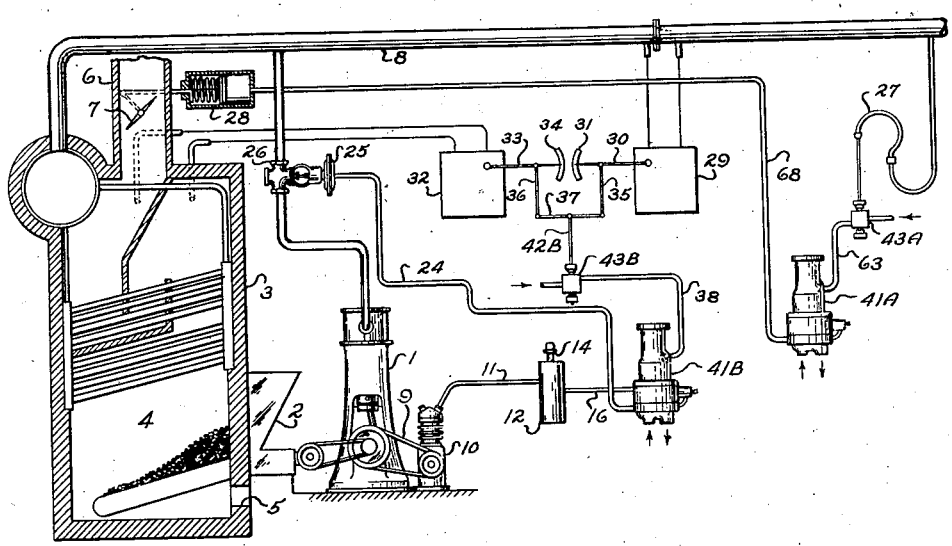

Fig. 8 illustrates diagrammatically a modified form of control system in which my invention is embodied.

Figure 9:
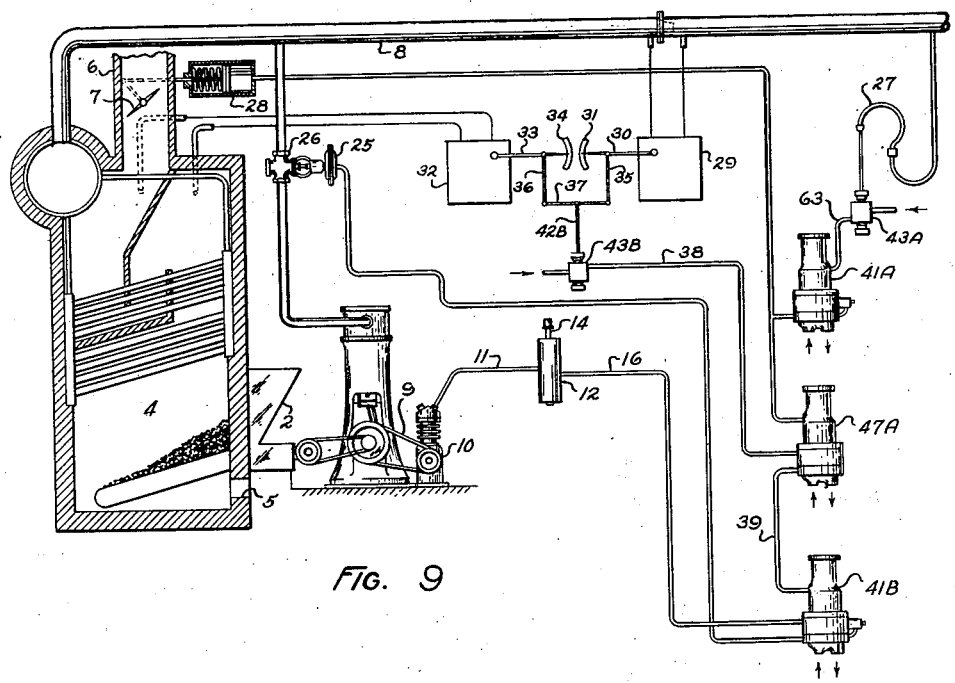

Fig. 9 illustrates diagrammatically a further modified form of control system in which my invention is embodied.

Figure 10:
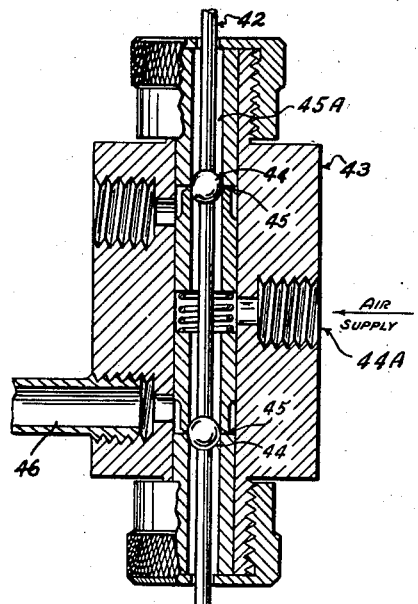

Fig. 10 is a sectional view to an enlarged scale of a pilot valve.

Figure 11:
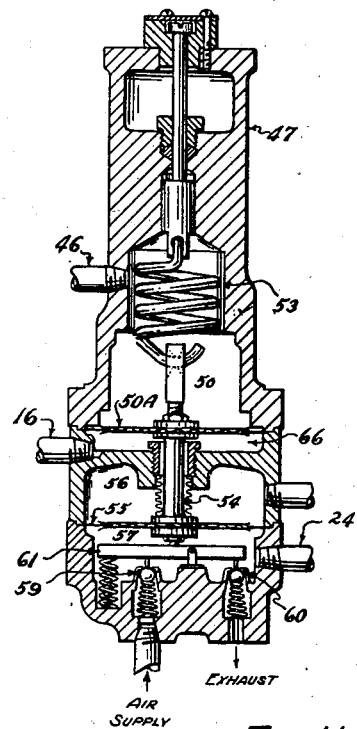

Fig. 11 is a sectional view to an enlarged scale of one form of fluid relay.

Figure 12:
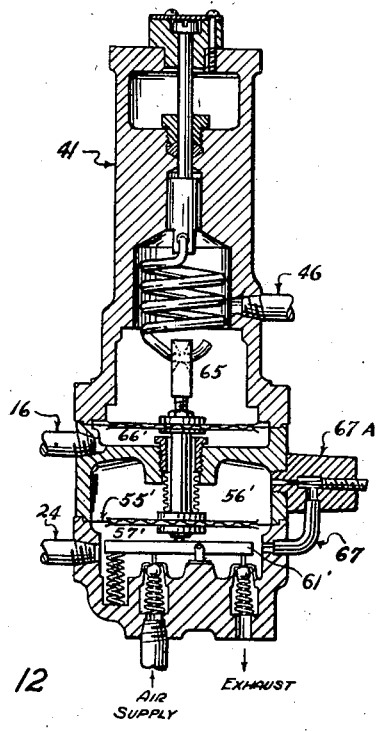

Fig. 12 is a sectional view to an enlarged scale of a standardizing fluid relay.

Figure 1:
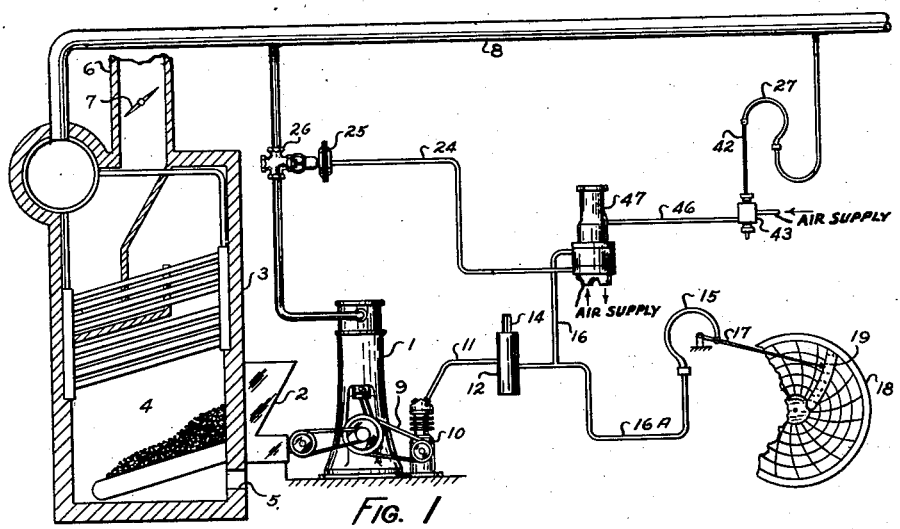
Fig. 1 illustrates diagrammatically a measuring and control system in which my invention is embodied.

Referring to Fig. 1, I have therein shown my invention adapted to indicate, record and control the speed of a vapor engine 1 operating a stoker 2 of a vapor generator 3. Air is supplied to a combustion chamber 4 through an inlet 5 and the gaseous products of combustion are ejected through a stack 6 in which is positioned a damper 7. Vapor passes from the generator through a conduit 8 to a point of usage (not shown).

Driven by the vapor engine 1 through a belt 9 is a fluid pump shown as a positive displacement air compressor 10, the speed of which will accordingly be proportional to the speed of the vapor engine 1. Air is discharged from the compressor 10 through a pipe 11 connecting to a receiver 12. As known, the rate of discharge of air will be proportional to, or vary in functional relation to, the speed of the compressor 10.

Figure 2:
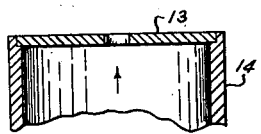
Fig. 2 is a sectional view to an enlarged scale of a restricted aperture arrangement shown in Fig. 1.

Air admitted to the receiver 12 is discharged to the atmosphere through a restricted aperture, such as an orifice 13, located in the extension 14 of the receiver 12 and shown to larger size in Fig. 2.

When the system is in equilibrium it is apparent that the rate of discharge from the receiver will be equal to the rate of admission, and as the flow of air through an aperture varies in functional relation to the pressure differential across the aperture, it follows that the pressure within the receiver 12 will vary in functional relation to the rate of discharge, or to the rate of admission, and accordingly to the speed of the compressor 10 and vapor engine 1. To indicate and/or record the speed of the vapor engine 1, I therefore provide a pressure sensitive device, such as a Bourdon tube 15, connected to a pressure transmitting pipe 16 from the receiver 12 by a pipe or capillary 16A. Actuated by the Bourdon tube 15 is an arm 17 cooperating with a time rotatable chart 18 and index 19 to give a time record and an indication respectively of the speed of the vapor engine 1. The chart 18 may be graduated in any desired units, such as "feet per minute," "R. P. M.," or the like.

In some applications it is desirable that the pressure within the receiver 12 vary in direct proportion to the speed of the compressor 10, or in other words that a straight line relation exist between the pressure within the receiver 12 and the speed of the vapor engine 1, as the chart 18 and index 19 may be uniformly graduated and it further simplifies and facilitates accurate control of the speed of the vapor engine 1. As known, the flow of fluid through an orifice or other pressure differential producing device from a region of higher pressure into a region of lower pressure varies as the square root of the pressure differential unless the pressure existing in the region of lower pressure is below the critical pressure for the then existing higher pressure. In the latter case the flow through the orifice will vary in direct proportion to the pressure in the region of higher pressure and will be independent of variations of pressure in the region of lower pressure, as first deduced by Napier. To further illustrate the difference, I have shown in Fig. 5 the relation existing between flow and pressure differential when the outlet pressure is above the critical pressure, and in Fig. 6 when it is below the critical pressure. As stated, when the outlet pressure is below the critical pressure no relation exists between pressure differential and flow, the flow varying in direct proportion to the inlet pressure.

By proper design of the orifice 13 I may maintain the fluid pressure within the receiver 12 sufficiently high throughout the operating range of the apparatus so that the pressure of the atmosphere will be below the critical pressure. For example, I may design the orifice 13 so that at the minimum operating speed of the vapor engine a pressure of approximately 13 lb. per square inch gage will exist in the receiver 12. Thereafter as the speed of the vapor engine 1 increases the pressure within the receiver 12 will increase in direct proportion thereto.

Figure 3:
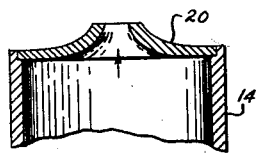
Fig. 3 is a sectional view to an enlarged scale of another form of restricted aperture arrangement.

In Fig. 3 I have shown a second form of a restricted aperture comprising a flow nozzle 20, which I may find desirable to employ in some cases. In general, the relation existing between differential pressure and flow through a nozzle is the same as for an orifice, and further when the discharge or outlet pressure is below the critical pressure for the existing inlet pressure, the flow through the nozzle will vary in direct proportion to the inlet pressure.

Figure 4:
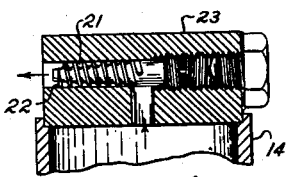
Fig. 4 is a sectional view to an enlarged scale of an adjustable restricted aperture arrangement.

In Fig. 4 I have shown a restricted aperture arrangement wherein the rate of fluid discharge will vary in straight line relation with the pressure differential regardless of the fact that the outlet pressure may be above the critical pressure for the existing inlet pressure, or regardless of whether a compressible or non-compressible pressure transmitting fluid is used. The restriction comprises a capillary channel 21 formed by the spiral thread of the screw 22 adjustably positioned in the block 23. The flow of fluid through a capillary restriction such as I have shown is commonly termed "viscous flow" and the rate of flow of fluid regardless of whether it be compressible or non-compressible will be in direct proportion to the pressure differential across the restriction. By employing the capillary restriction shown in Fig. 4 I may therefore produce a fluid pressure within the receiver 12 bearing a straight line relation to the speed of the vapor engine 1 regardless of whether the discharge pressure at the outlet of the restriction is above or below the critical pressure, or regardless of whether a compressible or non-compressible fluid is employed.

The fluid pressure established in the receiver 12 may be utilized to control the flow of vapor to the engine 1 to maintain its speed at a predetermined or desired value. In one form this is accomplished by transmitting fluid pressure within the chamber 12 through the pipe 16 to a chamber 66 of a relay 47. The relay 47 may be similar to that shown and described in my Patent 2,098,913 issued November 9, 1937, and shown to larger size in Fig. 11.

Pressures established in the chamber 66 are balanced against pressures established in a relay chamber 57 through the agenecy of opposed diaphragms 50A and 55 operatively connected by a movable member 54. Admission and discharge of pressure fluid from the chamber 57 is controlled by a fulcrumed valve member 61, operating a fluid supply valve 59 and an exhaust valve 60. The arrangement is such that upon an increase in pressure within the chamber 66 in response to an increase in speed of the vapor engine 1, the member 54 moves upwardly opening the exhaust valve 60 until the pressure within the chamber 57 is decreased in proportion to the increase in pressure within the chamber 66, when the member 54 will be positioned to the neutral position and valves 59 and 60 closed. The pressure, and accordingly the speed of the vapor engine 1 at which the member 54 will be in the neutral position, may be varied as desired through the agency of an adjustable spring 53 effective for producing a force upon the diaphragm 50A.

Fluid pressures established within the chamber 57 are transmitted through a pipe 24 to a diaphragm motor 25 of a regulating valve 26. The valve 26 is arranged to decrease the rate of flow of vapor to the engine 1 with decreasing pressures within the diaphragm motor 25.

In operation, upon an increase in speed of the vapor engine 1 above that desired for example, the pressure within the receiver 12 will increase, effecting a corresponding decrease in pressure within the chamber 57. This decrease in pressure transmitted to the diaphragm motor 25 will effect a proportionate positioning of the valve 26 in a closing direction, thus decreasing the rate of flow of vapor to the engine 1 and tending to restore the speed of the engine to the desired value. Conversely, upon a decrease in speed below that desired, the fluid pressure within the receiver 12 will decrease effecting a proportionate increase in pressure within the chamber 57, which will be effective to position the valve 26 in an opening direction, thus tending to increase the speed of the engine to the desired value. It is apparent that by proper adjustment of the spring 53 the engine may be maintained at any desired speed, thus producing any desired rate of vapor output from the boiler 3.

My invention further contemplates the establishment of a fluid pressure in accordance with a desired rate of speed and then controlling the speed in accordance with the difference between the actual and the desired speed. For example, it is frequently desirable to control the stoker speed of a vapor generator to maintain a predetermined or desired vapor pressure. Accordingly in Fig. 1 I show a Bourdon tube 27 sensitive to variations in steam pressure and adapted to position a movable valve member 42 of a pilot valve 43, shown to larger size in Fig. 10. The pilot valve 43 shown in cross section may be of the type forming the subject matter of a patent to Clarence Johnson, No. 2,054,464. The movable valve member 42 extends longitudinally through a passageway 45A and is provided with lands 44 of slightly less diameter than the passageway 45A. Fluid pressure admitted to the passageway 45A through the inlet 44A escapes past the lands 44 to the atmosphere and produces a pressure gradient across each land 44. Adjacent each land 44 is a thin outlet port 45 and it is apparent that the pressure existing at the outlet port will depend upon the position of the movable valve member 42. As I prefer to establish a fluid pressure varying inversely with variations in fluid pressure, I transmit the pressure existing at the lower outlet port 45 through a pipe 46 to a chamber 50 of the relay 47.

An increase in vapor pressure above that desired will effect a decrease in pressure within the chamber 50 which will effect a proportionate decrease in pressure within the chamber 57, producing a positioning of the valve 26 in a closing direction decreasing the speed of the vapor engine 1 and stoker 2, decreasing the rate of fuel admission and accordingly the rate of vapor production, tending to restore the vapor pressure to the desired value. It is apparent that upon a decrease in vapor pressure below that desired the converse will take place, the valve 26 being positioned in an opening direction, increasing the rate of fuel admission and thus tending to increase the vapor pressure to the desired value.

When, however, the speed of the engine decreases, the pressure within the receiver 12 and chamber 66 of the relay 47 will decrease, thus acting in opposition to the pressure established within the chamber 50 by the pilot 43. In general, it may therefore be said that the pilot 43 establishes a fluid pressure in accordance with the desired rate of speed of the vapor engine 1, that the compressor 10 and receiver 12 establishes a fluid pressure in accordance with the actual speed of the engine and that the relay 47 controls the rate of vapor flow to the engine in accordance with the difference in the fluid pressure.

In Fig. 12 I have illustrated a standardizing relay 41 such as forms the subject matter of a patent to Harvard H. Gorrie No. 2,098,914 which I may use in the control system shown in Fig. 1 in place of the relay 47. As with the latter, fluid pressures established by the pilot 43 are admitted to a chamber 65 and are effective for balancing pressures established in the relay chamber 57'. Likewise pressures established in the receiver 12 are transmitted through the pipe 16 to a chamber 66' and act against the pressure in the chamber 65.

In communication with the chamber 57' through a pipe 67, and throttling valve 67A, is a chamber 56'. Pressures in this chamber act against the pressures in chamber 57' and, as evident, for the valve member 61' to be in equilibrium must be equal to or in desired predetermined proportion to each other. The pressure in the chamber 56' serves to render ineffective the pressure in the chamber 57' against the diaphragm 55', so that the sole pressures effective for establishing a state of equilibrium are those in chambers 65 and 66'. As with the relay 47, the relay 41 acts to produce an immediate change in fluid pressure transmitted to the diaphragm motor 25 proportional to changes in the difference in pressures in chambers 65 and 66'; but thereafter due to the restricted communication between the chambers 56' and 57' the fluid pressure transmitted to the diaphragm motor will continue to change in the same sense until the difference in pressures in chambers 65 and 66' is restored to the original or predetermined difference.

A reference to specific values may aid in understanding the modified action of the relay 41 over the relay 47. Referring to relay 47, if the pressure in chamber 50 increases five pounds there will be a corresponding immediate pressure change in chamber 57 of five pounds. Thereafter as the speed of the vapor engine 1 changes as a result of such change, the pressure in chamber 66 will vary accordingly, effecting a change in pressure within the chamber 57 in opposite sense to the original change, producing a corresponding further secondary positioning of the valve 26.

By modifying the area of the diaphragm 50A relative to the area of the diaphragm 55, I may produce a primary change of say 10 lb. in chamber 57 for the 5 lb. change in chamber 50, but the secondary change then will be in opposite direction. In general, therefore, the action of the relay 47 is to produce an immediate and relatively large change in rate of vapor flow to the engine proportional to changes in the vapor pressure within the conduit 8, and thereafter to produce a further change in the rate of vapor flow in opposite sense, and proportional to the change in speed of the engine. By proper proportioning of the diaphragms 50A and 55, the relay 47 will serve to cause an immediate and large change in the rate of fuel supply to the vapor generator in excess of that required to restore the vapor pressure to the desired value and thereafter to gradually decrease the rate of fuel supply so that the vapor pressure does not overshoot and a hunting condition result.

Referring to relay 41, upon a 5 lb. change in pressure within the chamber 65 an immediate equal or proportional change will be produced in chamber 57'. Thereafter as the speed of the engine changes, the pressure in chamber 66' will change, tending to effect a change in pressure in chamber 57' in opposite sense. Simultaneously the changing pressure in chamber 56' will serve to effect a further change in pressure in chamber 57' in the original sense. If the pressure in chamber 66' changes more rapidly than the pressure in chamber 56' the change in pressure in chamber 57' will be in the opposite sense, and if slower, in the original sense. In practice it is usually preferable that changes in pressure in chamber 56' proceed slower than changes in pressure in the chamber 66', so that broadly speaking the action of the device is first to produce a change in the fuel supply to the controlled device, then to determine the effect of that change upon the output of the controlled device, then to produce a further change in the fuel supply and ad infinitum until for a desired output, that output is actually obtained. That the action once initiated will continue until such a condition results is evident by the fact that the pressure in chamber 56' will eventually equal and counterbalance the effect of pressure in the chamber 57' on the diaphragm 55'. Thus the sole forces establishing a state of equilibrium are due to the pressures in chambers 65 and 66', the difference between which must be restored to the original or predetermined value for the state of equilibrium to be established. The relay 41 therefore acts to produce an initial or primary change in the rate of fuel supply in proportion to the changes in the controlled condition and thereafter to produce a continuing change until the condition is restored to the predetermined or desired value.

Where fuel is burned on a stoker a latent storage of heat is present in the form of unburned coal. As known, the rate of heat output may be varied by changing the rate at which air is applied to the fuel bed. To maintain the fuel bed in correct condition the rate of fuel feed may be varied to maintain the efficiency of combustion at the highest possible value. In accordance with these general principles, and applied to the specific example of a vapor generator, the rate of air supply would be varied to maintain the vapor pressure at a desired value, and the rate of fuel supply varied to maintain a desired ratio between the rate of air flow and the rate of vapor flow from the generator.

In Fig. 8 I have shown a standardizing relay 41A sensitive to loading pressure produced by the pilot 43A and transmitting control pressures through a pipe 68 to the servo-motor 28 actuating the damper 7.

The standardizing relay 41A is similar to the standardizing relay 41, except that chamber 66' is open to the atmosphere. Upon a change in loading pressure established by the pilot 43A proportional to a change in vapor pressure within the conduit 8, the relay 41A acts to produce an initial proportional change in the pressure transmitted to the servo-motor 28, and thereafter to produce a slow continuing change until the loading pressure established by the pilot 43A is restored to that corresponding to the desired or predetermined vapor pressure within the conduit 8. Upon a decrease in vapor pressure within the conduit 8, below the predetermined value for example, the air supply to the vapor generator 3 will be increased a proportionate amount producing an immediate increase in the rate of vapor outflow, tending to restore the vapor pressure to the predetermined value; thereafter a slow continuing change in the rate of air supply by proper positioning of the damper 7 will be effected until the vapor pressure is restored to the predetermined value.

To maintain the fuel bed in proper condition, fuel is supplied in accordance with the rate of air flow to the generator 3 and further modified in accordance with the ratio between the rate of vapor flow from the generator and rate of air flow to the generator. To accomplish this I have shown in Fig. 8 a meter 29 of the rate of vapor flow through the conduit 8 provided with an indicator 30, which in cooperation with a scale 31 will indicate the rate of flow of vapor from the generator. The indicator 30 is adapted to move downward, upon an increase in the rate of flow of vapor from the generator. A similar meter 32 provided with an indicator 33 adapted to cooperate with a scale 34 measures the rate of flow of the products of combustion through the generator 3. The indicator 33 is adapted to move upward as the rate of flow of products of combustion increases. As known, the rate of flow of products of combustion is an indication of the rate of air supplied to the generator and the rate of flow of vapor is a measure of the heat supplied by the fuel. Accordingly a predetermined ratio between such rates should be maintained for maximum combustion efficiency. Such a relation gage as I have herein described and shown more or less diagrammatically may be of the type shown and described in Patent 1,257,965 to Bailey.

Depending from indicators 30 and 33 are links 35 and 36 respectively, pivotally supporting a horizontal link 37. So long as the desired ratio is maintained between the rate of air flow and the rate of vapor flow the arrangement is such that the mid-point of the horizontal link 37 will remain stationary. When, for example, the vapor flow is below the air flow the mid-point of the horizontal link 37 will be elevated proportional to the difference. Conversely when the vapor flow is above the air flow the mid-point will be lowered proportionately.

To produce a fluid pressure varying as the rate of air flow through the generator 3, I show the movable valve member 42B of a pilot valve 43B pivotally suspended from the link 37. So that the loading pressure produced will vary with the rate of air flow, the valve member 42B may be connected to the link 37 a predetermined distance to the left of the mid-point as viewed in the drawings. With this arrangement the loading pressure established at the outlet port of the pilot will increase proportionately to increases in air flow when proper ratio is maintained between the rate of air flow and vapor flow. If, however, the ratio varies the loading pressure will be modified a proportionate amount and in a direction to restore the desired ratio.

Loading pressures established by the pilot 43B are transmitted through the pipe 38 to the standardizing relay 41B and are effective for positioning the valve 26, to control the rate of vapor flow to the engine. In operation, assuming the vapor pressure within the conduit 8 to remain constant, so long as the desired relation is maintained between rate of air flow and rate of vapor flow, fuel will be supplied the generator 3 at a constant rate. Assuming, however, that the rate of vapor flow increases, producing a downward positioning of the indicator 30, the rate of fuel supply to the generator 3 would be decreased tending to decrease the rate of vapor output to restore the desired relation with respect to the rate of air flow. Upon a change in vapor pressure, for example a decrease, the immediate reaction would be a positioning of the damper 7 in a direction to increase the rate of air flow and thus to increase the rate of vapor output to restore the pressure to the desired value. The increased rate in air flow would effect an upward positioning of the indicator 37, which in turn would effect a proportionate increase in the rate of fuel supply to the generator 3, thus maintaining the fuel bed in the desired condition.

In Fig. 9 I have shown a further modification wherein the rate of fuel and air supplied the generator 3 is varied simultaneously in parallel in accordance with variations in vapor pressure within the conduit 8, and the rate of fuel supply is modified to maintain the desired relation between air flow through the generator and vapor flow from the generator. As shown, pressures established by the standardizing relay 41A are transmitted to the servo-motor 28 for positioning the damper 7 and to the chamber 50 of an averaging relay 47A. The relay 47A is in all aspects similar to the relay 47 and variations in pressure within the chamber 50 produce corresponding variations in the chamber 57 from whence they are transmitted through the pipe 39 to the standardizing relay 41B for control of the vapor engine 1. Upon a decrease in vapor pressure within the conduit 8, for example, the pressure transmitted from the standardizing relay 41A will increase, effecting a positioning of damper 7 in a direction to increase the rate of air flow and will simultaneously be transmitted to the averaging relay 47A and be effective for increasing the pressure within the standardizing relay 41B to produce an increase in rate of vapor flow to the engine 1, increasing the rate of fuel supply to the generator. In the modification shown in Fig. 9, loading pressures established by the pilot 43B are transmitted through the pipe 38 to the chamber 56 of the averaging relay 41A. When, for example, the desired relation between steam flow and vapor flow is destroyed by the air flow increasing above the desired value, the pressure produced by the pilot 43B will increase, effecting a corresponding increase in the pressure transmitted to the standardizing relay 47A, which in turn will increase the pressure transmitted to the servo-motor 25 of the valve 26, increasing the rate of vapor flow to the engine 1 and the rate of fuel supply to the generator 3. Accordingly the fuel bed is continuously maintained in correct condition for the existing rate of vapor generation.

In both the modifications shown in Figs. 8 and 9 I have shown fluid pressures established in the receiver 12 transmitted to the chamber 66' of the standardizing relay 41B so that the rate of vapor flow to the engine 1 will be corrected until the actual rate of fuel supply to the vapor generator corresponds to the desired rate indicated by the magnitude of the fluid pressure established in the chamber 65 through the agency of sensitive devices hereinbefore described.

It will be understood that by describing and illustrating certain embodiments of my invention I am not to be limited thereby except as to the claims appended hereinafter in view of the prior art.

This application is a division of my Patent 2,141,082 granted December 20, 1938.

What I claim as new, and desire to secure by Letters Patents of the United States, is:

1. In combination with a vapor generator, a member positioned both in accordance with the rate of air supply and in accordance with the ratio between the rate of air supply and rate of vapor generation, means for producing a first fluid pressure in accordance with the position of said member, a stoker for the generator, a motor for driving said stoker, a fluid compressor actuated by said motor, a chamber into which said compressor discharges, a nozzle in said chamber through which the fluid is discharged to atmosphere and means sensitive to the difference between the first fluid pressure and the pressure in said chamber for controlling the fuel supply to said stoker.

2. In combination with a vapor generator, means for producing a first fluid pressure in accordance with the ratio between the rate of air supply and rate of vapor generation, means for producing a second fluid pressure in accordance with the rate of fuel supply; a relay producing initial changes in a third fluid pressure proportional to changes in the difference between the first and second fluid pressures and thereafter producing continuing changes until the difference in said first and second fluid pressures is restored to a predetermined value; and control means for said fuel supply means actuated by said third fluid pressure.

3. In combination with a vapor generator, means for producing a first fluid pressure in accordance with the ratio between the rate of air supply and rate of vapor generation, fuel supply means, means for producing a second fluid pressure in accordance with the rate of fuel supply, means for producing primary variations in a third fluid pressure in accordance with changes in the difference between the first and second fluid pressures, and means sensitive to the third fluid pressure for producing a continuing secondary change in the third fluid pressure until the difference between the first and second fluid pressures is restored to a predetermined magnitude; and regulating means for the fuel supply means actuated by the third fluid pressure.

4. In combination with a vapor generator, means for producing a first fluid pressure in accordance with the pressure of the vapor generated, means for producing a second fluid pressure in accordance with the ratio between the rate of air supply and rate of vapor generation, fuel supply means, means for producing a third fluid pressure in accordance with the rate of fuel supply, means for producing a fourth fluid pressure in accordance with said first and second fluid pressures, means for producing a fifth fluid pressure in accordance with the third and fourth fluid pressures; and regulating means of the fuel supply means actuated by the fifth fluid pressure.

5. In combination with a vapor generator, means for producing a first fluid pressure in accordance with the pressure of the vapor generated, means for modifying the first fluid pressure in accordance with the ratio between the rate of air supply and vapor generation, fuel supply means for the generator, a fluid compressor actuated in accordance with the rate at which fuel is supplied, an apertured chamber into which said compressor discharges, means for producing primary changes in a second fluid pressure proportional to changes in the difference between the first fluid pressure and the fluid pressure in the chamber, means for producing a secondary change in the second fluid pressure until the difference is restored to a predetermined value; and control means for the fuel supply means actuated by the second fluid pressure.

6. In combination, a vapor generator, a stoker for supplying fuel to the generator, a pneumatic pilot valve having relatively movable elements for establishing a loading pressure in accordance with the relative positions of said elements, a servo-motor under the control of said fluid pressure for regulating the speed of said stoker, and means for relatively positioning said elements comprising, a lever pivotally connected to one of said elements and two operating connections to said lever each adapted to provide a lever fulcrum for movement of the element by the other, means for positioning one of said connections in one sense in correspondence to increases in the rate of vapor generation, means for positioning the other of said connections in opposite sense in correspondence with increases in the rate at which air is supplied the generator so that if a predetermined ratio is maintained between the rates of vapor generation and air supply the point on said lever midway between said connections remains stationary, said pivot connection between said lever and said one of said elements being displaced from said midway point so that said elements are relatively moved to produce a predetermined change in loading pressure when said connections are simultaneously moved equal amounts in opposite direction so that said stoker speed is varied both in accordance with changes in the rate of air supply and changes in the ratio between the rates of vapor generation and air supply.

7. In combination with a vapor generator, a first device adjusted to different positions in accordance with changes in the rate of vapor generation, a second device adjusted to different positions in accordance with the rate at which air is supplied to the generator for combustion, a pneumatic pilot valve having relatively movable elements for establishing a first loading pressure in accordance with the relative positions of said elements, means under the joint control of said devices for relatively positioning said elements to establish a loading pressure corresponding to the ratio between the rates of vapor generation and air flow, means for establishing a second loading pressure corresponding to the rate at which fuel is supplied the generator, a balancing relay under the joint control of said first and second loading pressures and by which a fluid pressure is established, and means under the control of said fluid pressure for regulating the rate at which fuel is supplied the generator.

PAUL S. DICKEY.